(12) United States Patent
Cadalen et al.

(10) Patent No.: US 11,226,218 B2
(45) Date of Patent: Jan. 18, 2022

(54) FLOW REGIME RECOGNITION FOR FLOW MODEL ADAPTATION

(71) Applicant: SCHLUMBERGER TECHNOLOGY CORPORATION, Sugar Land, TX (US)

(72) Inventors: Sebastien Cadalen, Paris (FR); Benoit Fournier, Paris (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 1259 days.

(21) Appl. No.: 15/034,759

(22) PCT Filed: Nov. 7, 2014

(86) PCT No.: PCT/US2014/064514
§ 371 (c)(1),
(2) Date: May 5, 2016

(87) PCT Pub. No.: WO2015/069995
PCT Pub. Date: May 14, 2015

(65) Prior Publication Data
US 2016/0290841 A1    Oct. 6, 2016

Related U.S. Application Data

(60) Provisional application No. 61/902,048, filed on Nov. 8, 2013.

(51) Int. Cl.
*G01F 1/44*      (2006.01)
*G01F 1/74*      (2006.01)
(Continued)

(52) U.S. Cl.
CPC ............... *G01F 1/44* (2013.01); *E21B 47/10* (2013.01); *E21B 49/08* (2013.01); *G01F 1/58* (2013.01); *G01F 1/74* (2013.01); *G01V 5/08* (2013.01)

(58) Field of Classification Search
CPC . E21B 47/10; E21B 49/08; G01F 1/44; G01F 1/58; G01F 1/74; G01V 5/08
See application file for complete search history.

(56) References Cited

U.S. PATENT DOCUMENTS

| 4,688,198 A | 8/1987 | Wiggins |
| 4,841,490 A | 6/1989 | Carron |

(Continued)

FOREIGN PATENT DOCUMENTS

| CN | 1469720 A | 1/2004 |
| CN | 101061504 A | 10/2007 |

(Continued)

OTHER PUBLICATIONS

Section 8.1 of "Forecasting: Principles and Practice", 2nd ed., Rob J Hyndman and George Athanasopoulos (Year: 2018).*

(Continued)

*Primary Examiner* — Roy Y Yi
*Assistant Examiner* — Geoffrey T Evans

(57) ABSTRACT

A sensor of a multiphase flow meter is operated to determine a physical property attributable to multiphase fluid flow in a conduit of the multiphase flow meter. A stationarity of the multiphase fluid flow is determined based on the determined physical property in actual conditions compared to expected noise of the sensor in stationary flow conditions. A flow model variable is selected from a plurality of flow model variables based on a gas content of the multiphase fluid flow and the determined stationarity. The multiphase fluid flow is then modeled by adjusting the selected flow model variable.

15 Claims, 4 Drawing Sheets

(51) Int. Cl.
    *E21B 49/08*     (2006.01)
    *G01V 5/08*     (2006.01)
    *G01F 1/58*     (2006.01)
    *E21B 47/10*     (2012.01)

(56) References Cited

U.S. PATENT DOCUMENTS

| | | | |
|---|---|---|---|
| 4,857,729 | A | 8/1989 | Gadeken et al. |
| 5,148,405 | A | 9/1992 | Belchamber et al. |
| 5,161,409 | A | 11/1992 | Hughes et al. |
| 5,350,925 | A | 9/1994 | Watson |
| 5,360,738 | A | 11/1994 | Jones et al. |
| 5,475,220 | A | 12/1995 | Hughes et al. |
| 5,550,761 | A * | 8/1996 | Pauchon ............... G05B 17/02 703/6 |
| 5,557,103 | A | 9/1996 | Hughes et al. |
| 5,608,215 | A | 3/1997 | Evans |
| 5,804,820 | A | 9/1998 | Evans et al. |
| 5,850,623 | A | 12/1998 | Carman, Jr. et al. |
| 6,097,786 | A | 8/2000 | Groves et al. |
| 6,405,604 | B1 | 6/2002 | Berard et al. |
| 6,686,589 | B2 | 2/2004 | Fitzgerald |
| 6,958,604 | B2 | 10/2005 | An et al. |
| 7,462,837 | B2 | 12/2008 | Russ |
| 7,617,055 | B2 | 11/2009 | Henry et al. |
| 7,661,302 | B2 | 2/2010 | Gysling |
| 7,908,930 | B2 | 3/2011 | Xie et al. |
| 8,259,299 | B2 | 9/2012 | Harra et al. |
| 8,290,721 | B2 | 10/2012 | Wehrs |
| 8,565,860 | B2 | 10/2013 | Kimchy et al. |
| 9,217,802 | B2 | 12/2015 | Muhl |
| 2004/0040746 | A1* | 3/2004 | Niedermayr ............ E21B 44/00 175/38 |
| 2005/0122840 | A1 | 6/2005 | Haldorsen |
| 2005/0273266 | A1 | 12/2005 | Nickel |
| 2006/0020403 | A1* | 1/2006 | Pusiol ..................... G01F 1/716 702/45 |
| 2006/0065824 | A1 | 3/2006 | Mickael |
| 2006/0180767 | A1 | 8/2006 | Ramsden |
| 2007/0006640 | A1 | 1/2007 | Gysling |
| 2007/0064532 | A1 | 3/2007 | Haldorsen |
| 2007/0284518 | A1 | 12/2007 | Randall |
| 2009/0213691 | A1 | 8/2009 | Christie et al. |
| 2009/0241672 | A1 | 10/2009 | Gysling |
| 2010/0139417 | A1 | 6/2010 | Kolahi |
| 2010/0305873 | A1 | 12/2010 | Sjoden et al. |
| 2012/0216625 | A1* | 8/2012 | Bruno ....................... G01F 1/36 73/861.04 |
| 2014/0110105 | A1* | 4/2014 | Jones ..................... E21B 47/10 166/250.01 |
| 2014/0208826 | A1 | 7/2014 | Larter et al. |
| 2014/0355737 | A1 | 12/2014 | Korkin et al. |
| 2015/0219782 | A1 | 8/2015 | Viswanathan et al. |
| 2016/0290846 | A1 | 10/2016 | Chazal |

FOREIGN PATENT DOCUMENTS

| | | |
|---|---|---|
| CN | 101946173 A | 1/2011 |
| EP | 1970702 A1 | 9/2008 |
| EP | 2574919 A1 | 4/2013 |
| EP | 2871478 A1 | 5/2015 |
| FR | 2818379 A1 | 6/2002 |
| GB | 2439423 A | 12/2007 |
| RU | 2184367 C2 | 6/2002 |
| RU | 2466383 C2 | 11/2012 |
| WO | 9614559 A1 | 5/1996 |
| WO | WO0125762 A1 | 4/2001 |
| WO | WO0250522 A1 | 6/2002 |
| WO | 2007089412 A2 | 8/2007 |
| WO | WO2008107181 A1 | 9/2008 |
| WO | WO2009036337 A2 | 3/2009 |
| WO | WO2009058964 A1 | 5/2009 |
| WO | WO2010066994 A1 | 6/2010 |
| WO | 2012000645 A1 | 1/2012 |
| WO | WO2012158759 A2 | 11/2012 |

OTHER PUBLICATIONS

European Search Report issued in the related EP Application 14861011.6, dated May 17, 2017 (3 pages).
Office action issued in the related RU application 2016120730, dated Feb. 8, 2017 (14 pages).
Office Action received in the related CN Application 201480071435.3 dated Mar. 1, 2018 (11 pages).
Communication Article 94-3 issued in the related EP Application 14861011 6, dated Jun. 1, 2017 (5 pages).
Decision of Grant issued in the related RU Application 201612070, dated May 25, 2017 (21 pages).
Decision of Grant issued in the related RU Application 2016122471, dated Jun. 28, 2018 (19 pages).
A. Sood, R.P. Gardner, A new Monte Carlo assisted approach to detector response function, Nuclear Instruments and Methods in Physics Research B 213, 100 (2004) (5 pages).
L.Wielopolski et al. Prediction of the pulse-height spectral distortion caused by the peak pile-up effect. Ruleigh, North Carolina, USA : s.n., 1976, Nuclear Instruments and Methods, vol. 133, pp. 303-309.
Extended Search Report issued in the related EP application 13306528. 4, dated Feb. 6, 2014 (8 pages).
Lavigne et al., Extraordinary improvement in scintillation with ASEDRA-solution to a 50-year-old problem, SPIE, Bellingham WV, Jan. 1, 2008 (11 pages).
Meng and D Ramsden L. J: An inter-comparison of three spectral-deconvolution algorithms for gamma-ray spectroscopy, IEEE Transactions on Nuclear Science, IEEE service center, New York, NY, US, Vo. 47, No. 4, pt 1 (8 pages).
International Search Report and written opinion issued in the related PCT Application PCT/US2014/064532, dated Feb. 23, 2015 (12 pages).
International Preliminary Report on Patentability issued in the related PCT Application PCT/US2014/064532, dated May 10, 2016 (10 pages).
Extended Search Report issued in the related EP application 13306529. 2, dated Feb. 4, 2014 (8 pages).
Leclair Rober et al., An Analytic model for the response of a CZT detector in diagnostic energy dispersive x-ray spectroscopy, Medical Physics, AIP, Melville, NY, US, vol. 33, No. 5, Apr. 24, 2006, pp. 1329-1337.
Krumrey M. et al., Calibration and characterization of semiconductor X-ray detectors with synchrotron radiation, Nuclear Instruments and methods in physics research, section A: Accelerators, spectrometers, detectors, and associated equipment, Elsevier B. V. North-Holand, NL, vol. 568, No. 1, Nov. 30, 2006, pp. 364-368.
Office Action issued in the related EP application 13306529.2, dated Sep. 1, 2017 (6 pages).
Office Action issued in the related RU application 2016122471, dated May 11, 2017 (17 pages).
Examination Report issued in the related SA application 516371084 dated Jun. 3, 2018.
Office Action issued in the related EP application 13306529.2, dated May 4, 2018 (8 pages).
International Search Report and Written Opinion issued in related International Application No. PCT/US2014/064514 dated Feb. 9, 2015 (8 pages).
International Preliminary Report on Patentability issued in related PCT application PCT/US2014/064514 dated May 10, 2016, 6 pages.
Second Office Action received in the related CN Application 201480071435.3 dated Feb. 2, 2019 (9 pages).
Klein et al., "Time-Frequency Analysis of Intermittent Two-Phase Flows in Horizontal Piping", Journal of the Brazilian Society of Mechanical Sciences and Engineering, vol. 26, No. 2, 2004, pp. 174-179.
Soldati et al., "Identification of two phase flow regimes via diffusional analysis of experimental time series", Experiments in Fluids, vol. 21, No. 3, Jul. 1996, pp. 151-160.
Communication Article 94-3 issued in the related EP Application 14861011.6, dated Nov. 5, 2018 (5 pages).

(56) References Cited

OTHER PUBLICATIONS

Office Action received in the EP Application 14861011.6, dated Jul. 17, 2020 (5 pages).
Chul Hwa Song et al., "Investigation of bubble flow developments and its transition based on the instability of void fraction waves", International Journal of Multiphase flow., vol. 21, No. 3, Jun. 1, 1995, pp. 381-404.

* cited by examiner

FLOW REGIME RECOGNITION FOR FLOW MODEL ADAPTATION

BACKGROUND

The present disclosure relates to methods and devices for determining the flow rate and/or phase fraction of various components in a multiphase fluid flow, sometimes referred to as multiphase flow meters (MPFM).

DESCRIPTION OF THE RELATED ART

The ability to accurately measure the flow rate of the various phases may depend on the type of multiphase fluid flow, e.g. if the multiphase fluid is gas rich, gas poor, or somewhere in between. Multiphase flow meters may employ a flow model to account for various types of multiphase flow conditions. Depending on the flow conditions, the variables or parameters within the flow model may be adjusted or adapted to more accurately measure the fluid flow rate of each phase. For example, a first variable may utilize flow characteristics for multiphase fluid flow where liquid is predominant, flow is potentially nonstationary, and the gas volume fraction (GVF) is less than about 85%. A second variable may utilize flow characteristics for multiphase fluid flow where gas is predominant, flow is stationary or almost stationary, and the GVF is greater than about 90-98%, depending on the operating pressure. Uncertainty may exist, however, with regard to how to adjust or adapt the variables and/or parameters in the flow model for multiphase fluid flow having a GVF between about 85% and about 98%, including what variables or parameters to adapt and/or adjust and, if so, when to do so. The present disclosure provides apparatuses and methods of adapting and/or adjusting the computation used to determine multiphase flow rates of multiphase fluids based on recognition of the flow regime.

SUMMARY

The present disclosure introduces a method comprising operating a sensor of a multiphase flow meter to determine a physical property attributable to multiphase fluid flow in a conduit of the multiphase flow meter. A stationarity of the multiphase fluid flow is determined based on the determined physical property in actual conditions compared to expected noise of the sensor in stationary flow conditions. At least one variable is selected from a plurality of variables based on a gas content of the multiphase fluid flow and the determined stationarity. The multiphase fluid flow is then modeled by adjusting or adapting the selected variable(s).

The present disclosure also introduces an apparatus comprising a multiphase flow meter. The multiphase flow meter comprises a conduit containing a multiphase fluid flow, a nuclear source, and a nuclear detector operable to detect nuclear energy emitted by the nuclear source through the conduit and multiphase fluid flow. The apparatus further comprises an electronic instrument operable to determine a flow regime and a gas content of the multiphase fluid flow based on nuclear energy detected by the detector compared to expected noise of the nuclear detector in stationary flow conditions. The electronic instrument is further operable to determine a stationarity of the multiphase fluid flow based on the determined flow regime, to select at least one variable from a plurality of variables based on the determined gas content and the determined stationarity, and to model the multiphase fluid flow by adjusting and/or adapting the selected variable(s).

The present disclosure also introduces a method comprising determining which of a plurality of variables an electronic instrument is adjusting to determine flow rates of each phase constituent of multiphase fluid flow within a conduit of a flow meter. The method further comprises operating the flow meter to determine a flow regime and a gas content of the multiphase fluid flow within the conduit, determining an indicator of stationarity of the multiphase fluid flow based on the determined flow regime and the determined gas content, and changing which of the plurality of flow model variables the electronic instrument adjusts to determine flow rates of each phase constituent of the multiphase fluid flow based on the determined gas content and the determined stationarity indicator.

BRIEF DESCRIPTION OF THE DRAWINGS

So that the manner in which the above recited features can be understood in detail, a more particular description may be had by reference to embodiments, some of which are illustrated in the appended drawings, wherein like reference numerals denote like elements. It should be understood, however, that the appended drawings illustrate various embodiments and are therefore not to be considered limiting of its scope, and may admit to other equally effective embodiments. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
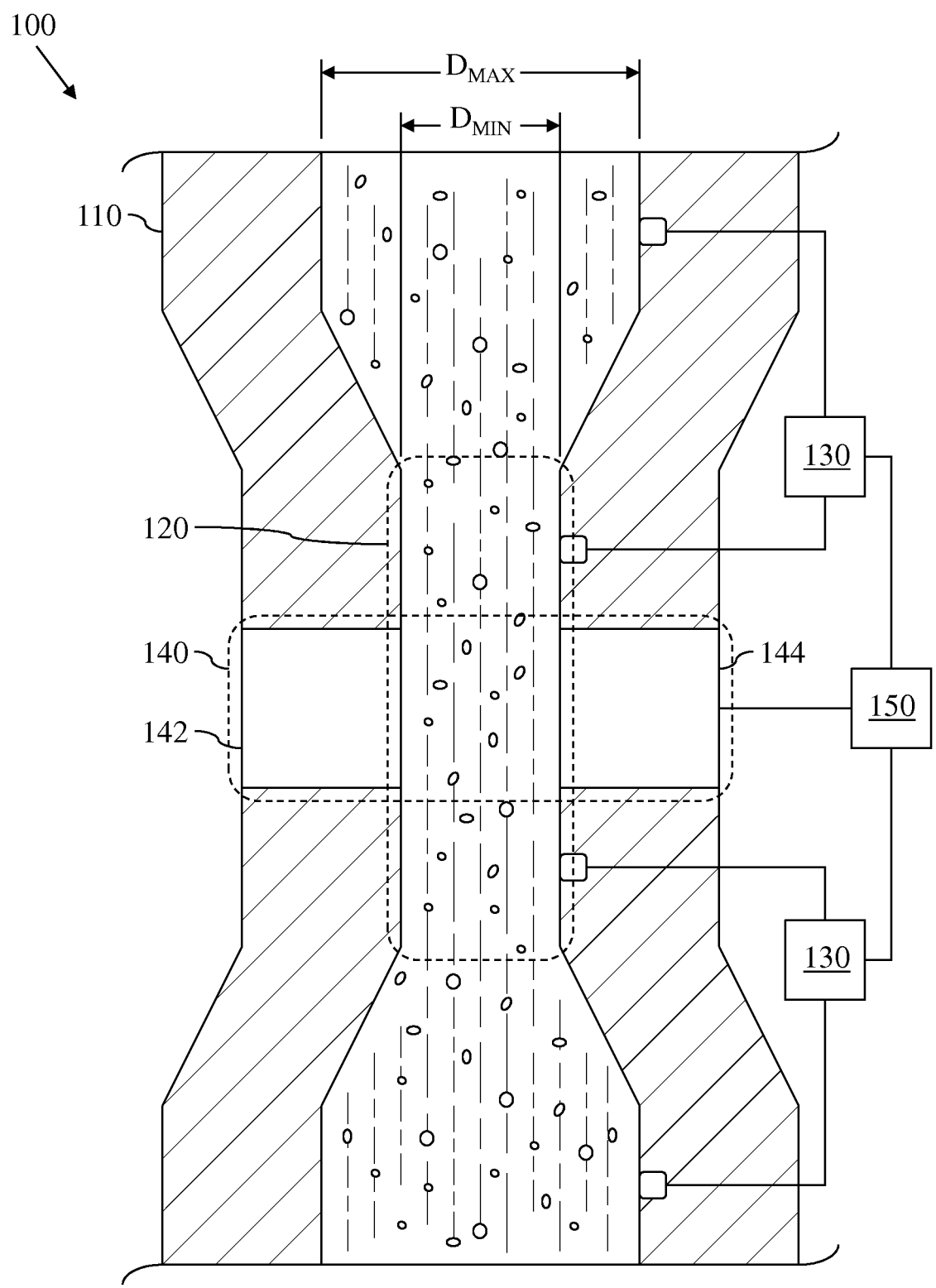
FIG. 1 is a schematic view of at least a portion of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of apparatus comprising a multiphase flow meter (MPFM) 100 according to one or more aspects of the present disclosure.

The MPFM 100 is operable to measure the flow rate of a multiphase fluid flowing in a conduit 110 of an installation at a well for producing hydrocarbons. Conduit 110 may be substantially vertical or substantially horizontal, or somewhere in between vertical and horizontal. The multiphase fluid comprises a liquid phase and a gas phase, wherein the liquid phase comprises one or more liquid hydrocarbons and perhaps water, whereas the gas phase comprises one or more gaseous hydrocarbons and perhaps steam. The GVF of the fluid flowing in the conduit 110 may vary from 0% (pure liquid) to 100% (pure gas).

The flow regime within the conduit 110 may be characterized as bubble flow, slug flow, or wet gas flow, such as an annular-mist wet gas flow. Other flow regimes, such as plug and churn flows, are also within the scope of the present disclosure. Bubble flow may have a GVF of less than about 20%, with gas bubble sizes less than about 10% of the minimum diameter $D_{MIN}$ of the conduit 110, and perhaps a flow velocity sufficient to enable substantial mixing. Slug flow may comprise a succession of gas pockets and liquid plugs, both individually occupying a substantial portion of the diameter of the conduit 110 and perhaps having individual lengths up to a few meters. Wet gas flow may have a GVF of at least about 85%, and the flow velocity of the gas phase may be sufficiently high that the fluid substantially lacks liquid plugs.

The minimum diameter $D_{MIN}$ may be the diameter of a Venturi portion 120 of the conduit 110, whereas a remaining portion of the conduit 110 may represent a maximum diameter $D_{MAX}$. The minimum diameter $D_{MIN}$ may be less than the maximum diameter $D_{MAX}$ by an amount ranging between about 40% and about 80%. Although the minimum diameter $D_{MIN}$ may vary within the scope of the present disclosure, examples include about 29 mm and about 52 mm, among others.

The MPFM 100 comprises one or more pressure sensors 130 operable to detect the pressure differential $\Delta p$ of the fluid traversing the transition between the minimum and maximum diameters $D_{MIN}$ and $D_{MAX}$ on the upstream and/or downstream side of the Venturi portion 120. The MPFM 100 also comprises a gas hold-up (GHU) sensor 140 comprising a nuclear emission source 142 and a corresponding detector 144 on opposing sides of the venturi 120. GHU is the fraction of gas present in a cross-section or interval of a conduit, such as the conduit 110. The GHU sensor 140 may be operable to emit and detect corresponding counts of gamma, X-ray, and/or other nuclear energy types, perhaps at different energy levels, whether serially or substantially simultaneously. The counts detected by the detector 144 may be utilized to determine GHU and/or other parameters of the multiphase fluid flow, whether by known or future-developed data processing techniques.

An electronic device 150 is in electronic communication with the one or more pressure sensors 130 and the GHU sensor 140. The MPFM 100 may comprise the electronic device 150, or may instead comprise means for electronically communicating with the electronic device 150.

Figure 2:
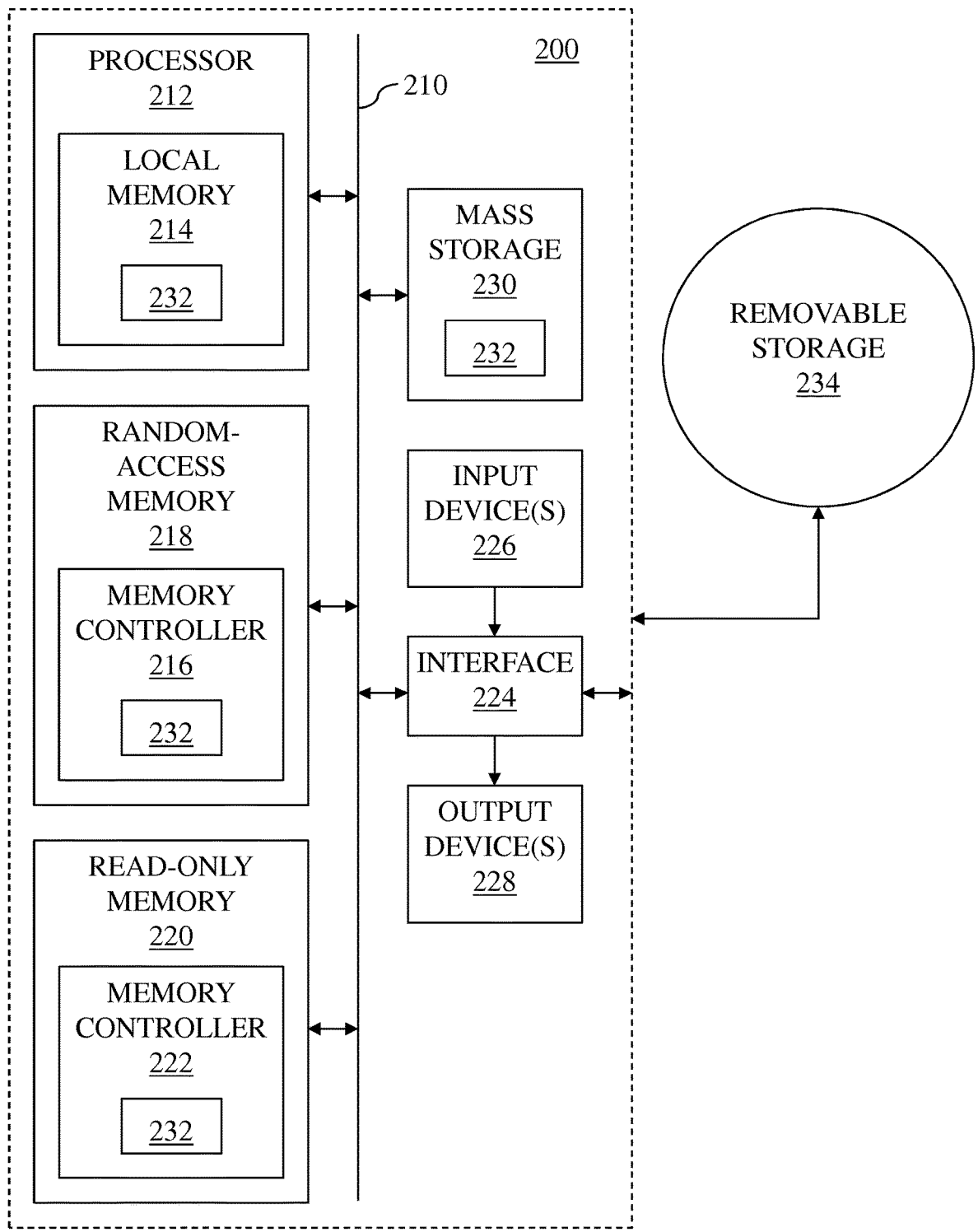
FIG. 2 is a block diagram of at least a portion of apparatus according to one or more aspects of the present disclosure.

FIG. 2 is a block diagram of an electronic device 200, at least a portion of which may form the electronic device 150 shown in FIG. 1. The example electronic device 200 may execute transitory and/or non-transitory machine-readable instructions to implement one or more aspects of the methods and/or processes described herein, and/or to implement one or more aspects of the example flow regime recognition and/or flow model transition described herein. The electronic device 200 may be or comprise, for example, one or more processors, controllers, special-purpose computing devices, servers, personal computers, personal digital assistant (PDA) devices, smartphones, internet appliances, and/or other type(s) of electronic device(s).

The electronic device 200 comprises a processor 212 such as, for example, a general-purpose programmable processor. The processor 212 may comprise a local memory 214, and may execute coded instructions 232 present in the local memory 214 and/or in another memory device. The processor 212 may execute, among other things, machine-readable instructions to implement the methods and/or processes described herein. The processor 212 may be, comprise, or be implemented by various types of processing units, such as one or more INTEL microprocessors, one or more microcontrollers from the ARM and/or PICO families of microcontrollers, one or more embedded soft/hard processors in one or more FPGAs, among other examples within the scope of the present disclosure.

The processor 212 may be in communication with a main memory including a volatile (e.g., random-access) memory 218 and a non-volatile (e.g., read-only) memory 220 via a bus 210. The volatile memory 218 may be, comprise, or be implemented by static random-access memory (SRAM), synchronous dynamic random-access memory (SDRAM), dynamic random-access memory (DRAM), RAMBUS dynamic random-access memory (RDRAM), thyristor random-access memory (T-RAM), zero-capacitor random-access memory (Z-RAM), twin transistor random-access memory (TTRAM), and/or other types of random-access memory device. The non-volatile memory 1120 may be, comprise, or be implemented by flash memory, mask read-only memory, programmable read-only memory (PROM), erasable programmable read-only memory (EPROM), electrically erasable programmable read-only memory (EEPROM), non-volatile random-access memory (NVRAM), and/or other types of memory device. One or more memory controllers 216 may control access to the volatile memory 218, and one or more memory controllers 222 may control access to the non-volatile memory 220.

The electronic device 200 may also comprise an interface circuit 224. The interface circuit 224 may be, comprise, or be implemented by various types of interface standards, such as Ethernet, universal serial bus (USB), and/or third generation input/output (3GIO), among others.

One or more input devices 226 may be connected to the interface circuit 224. The input device(s) 226 may permit a user to enter data and/or commands into the processor 212. The input device(s) may be, comprise, or be implemented by, for example, a keyboard, a mouse, a touchscreen, a track-pad, a trackball, an isopoint, a voice recognition system, a motion sensor, and/or a scanner, among others. Motion sensors, radio frequency (RF) transmitters, receivers, and/or transceivers, transformers, wireless network devices, cellular network devices, and/or other cordless input devices may also be utilized.

One or more output devices 228 may also be connected to the interface circuit 224. The output devices 228 may be, comprise, or be implemented by, for example, display devices, printers, and/or speakers, among others. Example display devices may include a segment display, a cathode ray tube (CRT) display, a liquid crystal display (LCD), a plasma display, an organic light-emitting diode (OLED) display, and a three-dimensional (3D) display, among others. The interface circuit 224 may also comprise a graphics driver card. The interface circuit 224 may also comprise a modem, a network interface card, and/or another communication device, such as to facilitate the exchange of data with external computers and/or electronic devices via a network, including via Ethernet, DSL (digital subscriber line), POTS (plain old telephone service), cable, cellular telephone, satellite, Bluetooth, WiFi (IEEE 802.11), WiMax (Worldwide Interoperability for Microwave Access), UWB (ultra-wideband), and others.

The electronic device 200 may also comprise one or more mass storage devices 230 operable to store machine-readable instructions and data. Examples of such mass storage devices 230 include disk drives, hard disk drives, compact disk (CD) drives, digital versatile disk (DVD) drives, flash memory, and memory cards, among others.

The coded instructions 232 may be stored in the local memory 214, the volatile memory 218, the non-volatile memory 220, the mass storage device 230, and/or on a removable storage medium 234, such as may be or comprise a CD or DVD.

As an alternative to implementing the methods and/or apparatus described herein in a system such as the electronic device 200 of FIG. 2, and/or in addition thereto, one or more aspects of the methods and or apparatus described herein may be embedded in other structures, such as an ASIC (application-specific integrated circuit) and/or other application-specific processors.

Figure 3:
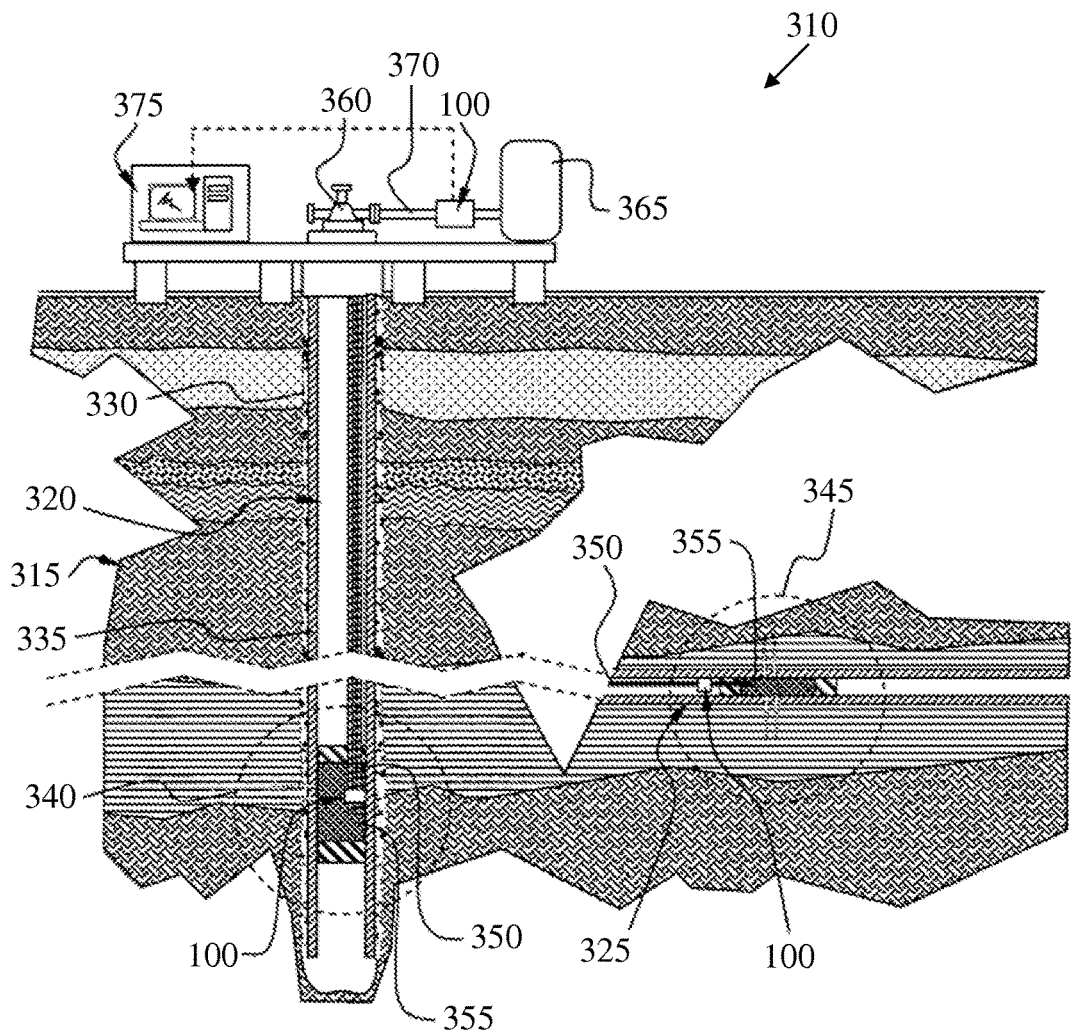
FIG. 3 is a schematic view of at least a portion of apparatus according to one or more aspects of the present disclosure.

FIG. 3 is a schematic view of a wellsite representing an example environment in which the MPFM 100 may be utilized according to one or more aspects of the present disclosure. The wellsite includes surface equipment 310 above a hydrocarbon geological formation 315 into which a wellbore 320 extends, and is in a production phase after drilling, completion, and perforating operations have been completed. The wellbore 320 may comprise one or more horizontal or deviated portions 325 extending from an initial, substantially vertical portion, and may be cased, partially cased, or uncased. A cased portion of the wellbore 320 may comprise an annulus 330 and a casing 335. The annulus 330 may be at least partially filled with cement or gravel pack, for example.

Production zones 340 and 345 may comprise perforations and downhole production equipment 350, such as packers, tubing, and valves, among other examples. A multiphase fluid 355 may flow out of the production zones 340 and 345, through the downhole production equipment 350, and out of the wellbore 320 via a wellhead 360.

The wellhead 360 is in fluid communication with production equipment 365 by one or more flowlines 370. The production equipment 365 may comprise a combination of one or more burners, heat exchangers, heaters, pressure reducers, pumps, separators, tanks, treaters, and/or other components, interconnected by various piping, tubing, and/or other conduits.

One or more instances of the MPFM 100 described above may be installed in various locations at surface and downhole. For example, an MPFM 100 may be in fluid communication with one of the flowlines 370, or with the downhole production equipment 350 of one or more of the production zones 340 and 345. The MPFM 100 at surface may be in electrical communication with various surface electronic apparatus 375, such as may comprise control and data acquisition equipment. One or more components of the surface electronic apparatus 375 may be embodied in, or otherwise substantially similar to, the electronic device 150 shown in FIG. 1 and/or one or more components of the electronic device 200 shown in FIG. 2.

Referring to FIGS. 1-3 collectively, at least a portion of the multiphase fluid 355 is directed to the conduit 110 of the MPFM 100. One or more of the electronic device 150, other components of the MPFM 100, one or more components of the electronic device 200, one or more components of the surface electronic apparatus 375, and/or other equipment components (hereafter collectively referred to as the "Electronic Instruments") are independently and/or cooperatively operable to determine the overall GHU of the multiphase fluid in the conduit 110. One or more of the Electronic Instruments may also comprise a flow model, having one or more variables and/or parameters that may be adjusted and/or adapted depending on the detected flow regime, for determining volumetric flow rates of the constituent phases of different flow regimes, and may be independently and/or cooperatively operable to detect an actual flow regime of the multiphase fluid flow within the conduit 110. As such, one or more of the Electronic Instruments may also determine which of the different flow model variables and/or parameters should be adapted and/or adjusted based on the determined GHU and the determined flow regime. One or more of the Electronic Instruments may also be independently and/or cooperatively operable to switch between the different flow model variables and/or parameters to be adjusted and/or adapted, perhaps automatically and gradually, in response to a detected change in the detected GHU and/or the detected flow regime.

Determination of the flow regime by one or more of the Electronic Instruments is based on the time series analysis of high-frequency nuclear count rates detected by the GHU sensor 140. Theoretical statistics of nuclear counts of several energies are readily available due to predictable Poisson noise. Accordingly, measured data and/or statistics thereof will follow theoretical data and/or statistics thereof if the multiphase fluid flow exhibits stationarity, but will deviate if the fluid flow exhibits substantial nonstationarity.

Stationarity, as used herein, refers to when a process or a field of any variable $A(x,t)$ is statistically stationary if all statistics are invariant under a shift in time. Thus, a stationary process has the property that the mean, variance, and auto-correlation structure do not change over time. Stationarity may be indicated, visually speaking, by a flat looking series without trend and constant variance and constant auto-correlation structure over time with no periodic fluctuations. That is, the unchanging properties in a fluid flow exhibiting stationarity are limited to statistics of parameters and not directly to parameters themselves.

Determining how the measured nuclear data differs from the theoretical nuclear data may rely on, for example, the dimensionless difference of the covariance matrices C, as set forth in the following equation:

$$Q_{i,j} = \frac{C_{i,j}^{meas} - C_{i,j}^{theo}}{\sigma_{i,j}}$$

where i and j are indexes for different energy levels at which nuclear energy is emitted by the nuclear source 142, whether substantially simultaneously or serially, and σ is the standard deviation or a factor related thereto. However, if a single energy level is utilized, or perhaps if a physical measurement from an additional sensor, such as a venturi differential-pressure (DP) sensor, is utilized, the covariance matrices C may collapse to a single, real number. In some embodiments, sensor 140 may be a venturi DP sensor used instead of or in addition to the high frequency nuclear count rate sensor. Determination of the flow regime by one or more of the Electronic Instruments may then be based on data from a fast venturi DP sensor. The venturi DP sensor could also indicate mixture density (gas content) for a multiphase flow of largely constant long-time-averaged mass flow rate.

A stationarity indicator may thus be that of the spectral radius, $\rho$, which is a norm of the matrix Q, which may be computed utilizing a sample of the nuclear count data collected over a predetermined time period at a predetermined frequency. For example, the predetermined time period may be about 1 minute, or about 5 minutes, or perhaps range between about 1 minute and about 5 minutes, and the predetermined frequency may be about 45 Hz or about 50 Hz. However, other time periods and frequencies are also within the scope of the present disclosure.

Figure 4:
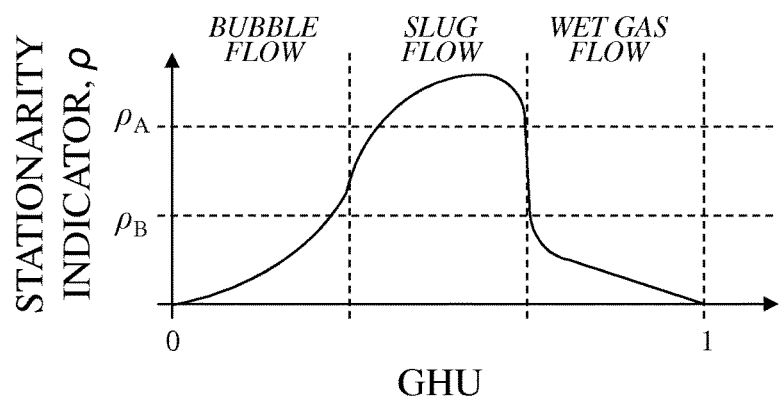
FIG. 4 is a chart demonstrating one or more aspects of the present disclosure.

An example of the resulting stationarity indicator $\rho$ is depicted in FIG. 4. The GHU of the fluid flow is shown on the x-axis, where pure liquid (GHU=0) is at the origin, and the GHU increases along the positive x-axis until the fluid flow is pure gas (GHU=1). The stationarity of the fluid flow is shown as the y-axis, where completely stationary flow ($\rho$=0) is at the origin, and the nonstationarity increases (or the stationarity decreases) along the positive y-axis. A predetermined stationarity $\rho_B$ may be the upper limit of stationarity for the purposes of subsequent actions in the context of the present disclosure, while another predetermined stationarity $\rho_A$ may similarly be the lower limit of nonstationarity. A stationarity indicator $\rho$ between $\rho_B$ and $\rho_A$ may indicate that the multiphase fluid flow is a mix of stationary and nonstationary flow. Moreover, one or more aspects introduced herein in the context of determining the stationarity indicator $\rho$ may be applicable or readily adaptable for use with other or additional norms and/or measures that may be utilized in the determination of the stationarity indicator $\rho$.

FIG. 4 demonstrates that the stationarity indicator $\rho$ may be utilized to discriminate stationary flow from nonstationary flow at the transition between moderate gas content (slug flow) and high gas content (wet gas flow). Although only bubble flow, slug flow, and wet gas flow are shown in FIG. 4, the stationarity indicator $\rho$ may also be utilized to discriminate between the other flow regimes such as those previously discussed. The stationarity indicator $\rho$ determined as above, in conjunction with the gas content also determined utilizing the MPFM 100, may then be utilized to select which of the one or more flow model variables stored by one or more of the Electronic Instruments described above should be utilized to determine volumetric flow rates of the different phases of the fluid flow.

For example, assuming the one or more Electronic Instruments are storing two or more flow model variables, a first variable may be utilized for flow regimes having a low to moderate GHU regardless of the determined stationarity indicator $\rho$. The first variable may also be utilized for flow regimes having a moderate to high GHU if the flow is substantially stationary (i.e., $\rho<\rho_B$). A second variable may be utilized for flow regimes having a moderate to high GHU if the flow is substantially nonstationary (i.e., $\rho>\rho_A$).

In practice, both variables may be adjusted and/or adapted simultaneously at all times, although such simultaneous adaptation/adjustment may be limited to when the GHU is greater than a predetermined GHU threshold and the stationarity indicator falls between first and second predetermined stationarity indicator thresholds, which may coincide with the substantially stationary threshold $\rho_B$ and the substantially nonstationary threshold $\rho_A$. The predetermined GHU threshold may be 0.5, although other values are also within the scope of the present disclosure. The substantially stationary threshold $\rho_B$ may be about 20 and the substantially nonstationary threshold $\rho_A$ may be about 400, although other values are also within the scope of the present disclosure. The specific values may depend on the specific formulation of $Q_{i,j}$ and $\rho$, and perhaps on the shape and size of the apparatus, among other aspects which may affect flow stationarity. The multiphase flow rate may be determined as an adaptation or adjustment (continuously or otherwise) of the one or more flow model variables.

Figure 5:
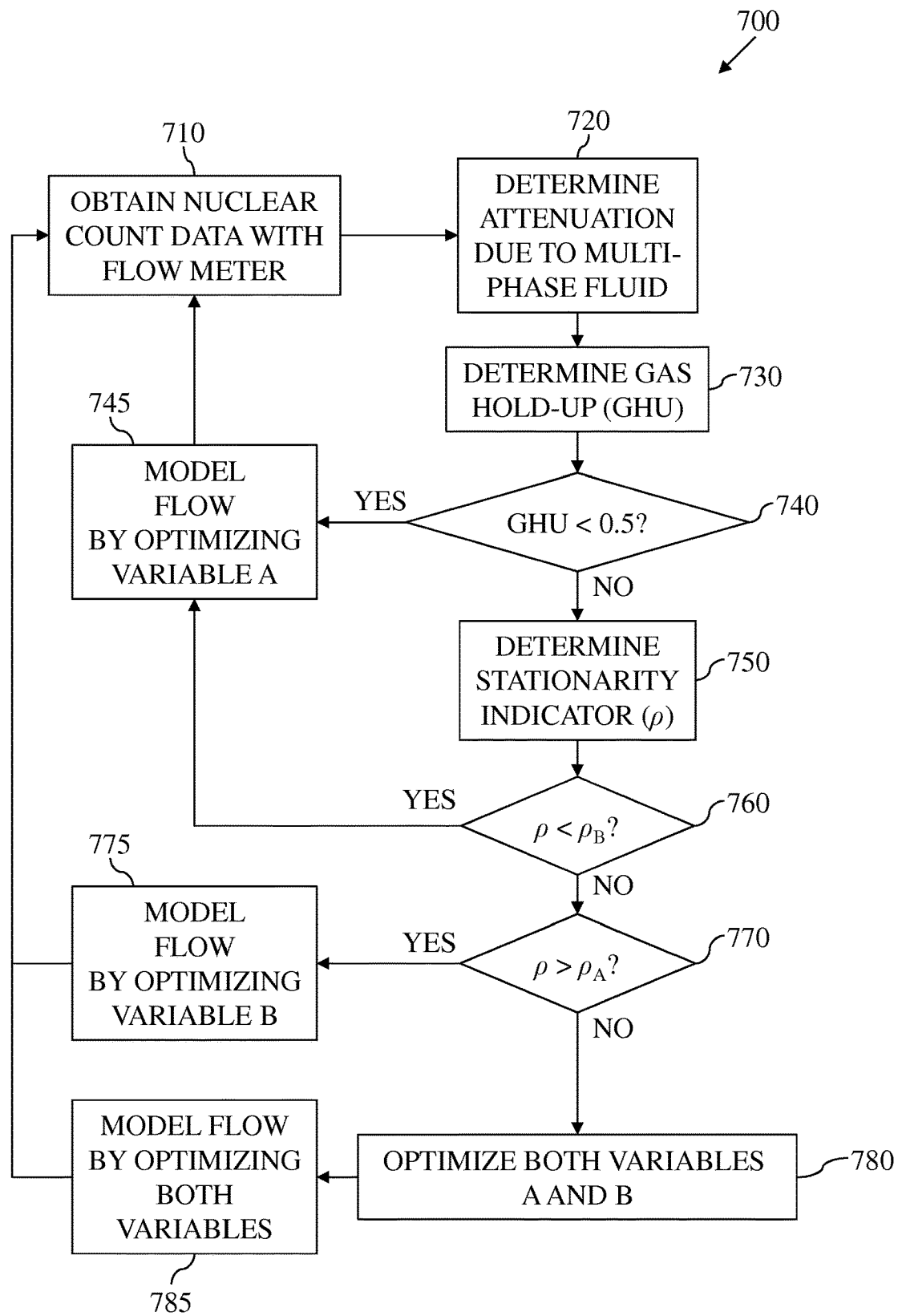
FIG. 5 is a flow-chart diagram of at least a portion of a method according to one or more aspects of the present disclosure.

FIG. 5 is a flow-chart diagram of at least a portion of a method (700) according to one or more aspects of the present disclosure. The method (700) may be executed by one or more of the Electronic Instruments described above. One or more aspects of the method (700) may also be performed by additional components shown in FIGS. 1-3. As such, the following description refers to FIGS. 1-3 and 5, collectively.

For example, the GHU sensor 140 of the MPFM 100 shown in FIG. 1 may be operated to obtain (710) nuclear count data associated with multiphase fluid flowing through the conduit 110 of the MPFM 100. This data may then be utilized to determine (720) attenuation attributable to the multiphase fluid. In general, gas content and stationarity of the multiphase fluid flow may then be determined based on the determined attenuation, and the flow regime of the multiphase fluid flow in the conduit 110 may be determined based on the determined gas content and the determined stationarity. Determining the flow regime may entail selecting the flow regime from a predetermined plurality of possible flow regimes, such as may comprise or consist of bubble flow, slug flow, and wet gas flow. A flow model variable may then be selected, perhaps from a plurality of different flow model variables, based on the determined gas content, the determined stationarity, and/or the determined flow regime, and the multiphase fluid flow may be modeled by adjusting and/or adapting the selected flow model variable.

For example, after determining (720) the attenuation attributable to the multiphase fluid, the GHU may be determined (730) based on the determined attenuation. The method (700) may comprise determining (740) whether the determined GHU is less than a predetermined GHU threshold (e.g., 0.5). If the determined GHU is determined (740) to be less than the predetermined GHU threshold, then the multiphase fluid flow in the conduit 110 of the MPFM 100 may be modeled (745) by adjusting a first variable, referred to in FIG. 5 as VARIABLE A. The method (700) may then be repeated by, for example, obtaining (710) additional nuclear count data utilizing the MPFM 100, determining (720) attenuation, determining GHU (730), etc.

However, if the determined GHU is determined (740) to be greater than the predetermined GHU threshold, then the stationarity indicator $\rho$ may be determined (750) as described above. If the determined stationarity indicator $\rho$ is determined (760) to be less than a first predetermined stationarity indicator threshold (such as the upper stationarity threshold $\rho_B$), then the multiphase fluid flow in the conduit 110 of the MPFM 100 may be modeled (745) by adjusting VARIABLE A. If the determined stationarity indicator $\rho$ is determined (760) to be greater than the first predetermined stationarity indicator threshold, and if the determined stationarity indicator $\rho$ is determined (770) to be greater than a second predetermined stationarity indicator threshold (such as the lower nonstationarity threshold $\rho_A$), then the multiphase fluid flow in the conduit 110 of the MPFM 100 may be modeled (775) by adjusting a second variable, referred to in FIG. 5 as VARIABLE B. If the determined stationarity indicator $\rho$ is determined (760) to be greater than the first predetermined stationarity indicator threshold, and if the determined stationarity indicator ρ is determined (770) to be less than a second predetermined stationarity indicator threshold, then VARIABLE A and VARIABLE B may be both adjusted and/or adapted (780) as described above, and the multiphase fluid flow in the conduit 110 of the MPFM 100 may be modeled (785) utilizing the adjustment of both VARIABLE A and VARIABLE B. The method (700) may then be repeated.

One or more aspects of the present disclosure are described in the context of determining flow regime based on time series analysis of high-frequency nuclear count rates detected by a nuclear sensor. However, one or more of such aspects may be applicable or readily adaptable for use with other types of sensors, including sensors having an available value of noise, whether it is accurate and/or predictable or a poor estimation.

In view of the entirety of the present disclosure, a person having ordinary skill in the art will readily recognize that the present disclosure introduces a method comprising: operating a sensor of a multiphase flow meter to determine a physical property attributable to multiphase fluid flow in a conduit of the multiphase flow meter; determining a stationarity of the multiphase fluid flow based on the determined physical property in actual conditions compared to expected noise of the sensor in stationary flow conditions; selecting a one or more variables from a plurality of flow model variables based on a gas content of the multiphase fluid flow and the determined stationarity; and modeling the multiphase fluid flow utilizing the selected variable to be adjusted. The sensor may comprise a nuclear sensor and the physical property may be attenuation. The method may further comprise determining the expected noise.

The method may further comprise determining a flow regime of the multiphase fluid flow based on the gas content and the determined stationarity. Determining the flow regime may comprise selecting the flow regime from a predetermined plurality of possible flow regimes. The predetermined plurality of possible flow regimes may comprise: a bubble flow regime in which the multiphase fluid flow has a gas volume fraction (GVF) less than about 20% and bubble sizes less than about 10% of a diameter of the conduit; a slug flow regime in which the multiphase fluid flow comprises a succession of gas pockets and liquid plugs alternatingly occupying a substantial portion of the diameter of the conduit; and a wet gas flow regime in which the multiphase fluid flow has a GVF of at least about 85% and substantially lacks liquid plugs.

The sensor may comprise a nuclear source operable to emit nuclear energy through the conduit to an opposing nuclear detector, and determining the physical property attributable to the multiphase fluid flow may utilize statistical data based on nuclear energy detected by the nuclear detector. The nuclear energy detected by the detector may comprise nuclear energy emitted from the nuclear source at each of a plurality of different energy levels.

The method may further comprise: determining a gas hold-up (GHU) of the multiphase fluid flow; and determining the gas content of the multiphase fluid flow based on the determined GHU. Selecting the flow model variable from the plurality of flow model variables based on the determined gas content and the determined stationarity may comprise: selecting a first variable if the determined gas content is less than a predetermined GHU threshold; selecting the first variable if the determined gas content is greater than the predetermined GHU threshold and the determined stationarity indicator is less than a first predetermined stationarity indicator threshold; selecting a second variable if the determined gas content is greater than the predetermined GHU threshold and the determined stationarity indicator is greater than a second predetermined stationarity indicator threshold; and selecting a third variable and/or parameter if the determined gas content is greater than the predetermined GHU threshold and the determined stationarity indicator is between the first and second predetermined stationarity indicator threshold. The method may further comprise: determining that the multiphase fluid flow is substantially stationary if the determined stationarity indicator is below the first predetermined stationarity indicator threshold; determining that the multiphase fluid flow is substantially nonstationary if the determined stationarity indicator is above the second predetermined stationarity indicator; and determining that the multiphase fluid flow is in transition between substantially stationary and substantially nonstationary if the determined stationarity indicator is between the first and second predetermined stationarity indicator thresholds. The third variable and/or parameter may be a combined adjustment of the first and second variables. The combined adjustment of the first and second variables may be a combined adjustment of both variables that is proportional to differences between the determined stationarity indicator and the first and second predetermined stationarity indicator thresholds. The combination of the first and second adjusted variables may be based on a function of the determined stationarity indicator.

The present disclosure also introduces an apparatus comprising: a multiphase flow meter comprising: a conduit containing a multiphase fluid flow; a nuclear source; and a nuclear detector operable to detect nuclear energy emitted by the nuclear source through the conduit and multiphase fluid flow; and an electronic instrument operable for: determining a flow regime and a gas content of the multiphase fluid flow based on nuclear energy detected by the detector compared to expected noise of the nuclear detector in stationary flow conditions; determining a stationarity of the multiphase fluid flow based on the determined flow regime; selecting a flow model variable from a plurality of variables based on the determined gas content and the determined stationarity; and modeling the multiphase fluid flow by adjusting the selected variable. The apparatus may further comprise tubing extending from a production zone of a wellbore penetrating a subterranean formation, wherein the tubing is in fluid communication with the conduit.

The present disclosure also introduces a method comprising: determining which of a plurality of fluid flow model variables an electronic instrument is adjusting and/or adapting to determine flow rates of each phase constituent of multiphase fluid flow within a conduit of a flow meter; operating the flow meter to determine a flow regime and a gas content of the multiphase fluid flow within the conduit; determining an indicator of stationarity of the multiphase fluid flow based on the determined flow regime and the determined gas content; and changing which of the plurality of flow model variables the electronic instrument adjusts to determine flow rates of each phase constituent of the multiphase fluid flow based on the determined gas content and the determined stationarity indicator. Changing which of the plurality of variables the electronic instrument adjusts may comprise changing from a first variable to a second variable. Changing which of the plurality of variables the electronic instrument adjusts may comprise changing from a first flow model variable to a combined adjustment of the first variable and a second variable.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The invention claimed is:

1. A method, comprising:
operating a sensor of a multiphase flow meter to determine a physical property attributable to multiphase fluid flow in a conduit of the multiphase flow meter;
determining a stationarity of multiphase fluid flow based on the determined physical property in actual conditions compared to expected noise of the sensor in stationary flow conditions;
selecting a flow regime from a plurality of flow regimes based on a gas content of the multiphase fluid flow and the determined stationarity; and
modeling the multiphase fluid flow based on the selected flow regime.

2. The method of claim 1 wherein the sensor comprises a nuclear sensor and the physical property is attenuation.

3. The method of claim 1, wherein the sensor comprises a venturi differential-pressure sensor and the physical property is differential pressure data.

4. The method of claim 1 further comprising determining the expected noise.

5. The method of claim 1 wherein the plurality of flow regimes comprises:
a bubble flow regime in which the multiphase fluid flow has a gas volume fraction (GVF) less than about 20% and bubble sizes less than about 10% of a diameter of the conduit;
a slug flow regime in which the multiphase fluid flow comprises a succession of gas pockets and liquid plugs alternatingly occupying a substantial portion of the diameter of the conduit; and
a wet gas flow regime in which the multiphase fluid flow has a GVF of at least about 85% and substantially lacks liquid plugs.

6. The method of claim 1 wherein the sensor comprises a nuclear source operable to emit nuclear energy through the conduit to an opposing nuclear detector, and wherein determining the physical property attributable to the multiphase fluid flow utilizes statistical data based on nuclear energy detected by the nuclear detector.

7. The method of claim 6 wherein the nuclear energy detected by the detector comprises nuclear energy emitted from the nuclear source at each of a plurality of different energy levels.

8. The method of claim 1 further comprising:
determining a gas hold-up (GHU) of the multiphase fluid flow; and
determining the gas content of the multiphase fluid flow based on the determined GHU.

9. The method of claim 8 wherein selecting the flow regime from the plurality of variables based on the determined gas content and the determined stationarity comprises at least one of:

selecting a first flow regime if the determined gas content is less than a predetermined GHU threshold;
selecting the first flow regime if the determined gas content is greater than the predetermined GHU threshold and the determined stationarity indicator is less than a first predetermined stationarity indicator threshold;
selecting a second flow regime if the determined gas content is greater than the predetermined GHU threshold and the determined stationarity indicator is greater than a second predetermined stationarity indicator threshold; and
selecting a third flow regime if the determined gas content is greater than the predetermined GHU threshold and the determined stationarity indicator is between the first and second predetermined stationarity indicator threshold.

10. The method of claim 9 further comprising at least one of:
determining that the multiphase fluid flow is substantially stationary if the determined stationarity indicator is below the first predetermined stationarity indicator threshold;
determining that the multiphase fluid flow is substantially nonstationary if the determined stationarity indicator is above the second predetermined stationarity indicator; and
determining that the multiphase fluid flow is in transition between substantially stationary and substantially nonstationary if the determined stationarity indicator is between the first and second predetermined stationarity indicator thresholds.

11. The method of claim 9 wherein modeling the multiphase fluid flow is based on a value proportional to differences between the determined stationarity indicator and the first and second predetermined stationarity indicator thresholds.

12. The method of claim 9 wherein modeling the multiphase fluid flow is based on a function of the determined stationarity indicator.

13. An apparatus, comprising:
a multiphase flow meter comprising:
a conduit containing a multiphase fluid flow; a nuclear source; and a nuclear detector operable to detect nuclear energy emitted by the nuclear source through the conduit and multiphase fluid flow; and
an electronic instrument operable for:
determining a stationarity of multiphase fluid flow based on a nuclear energy detected by the detector in actual conditions compared to expected noise of the detector in stationary flow conditions
selecting a flow regime from a plurality of flow regimes based on the determined stationarity and a gas content of the multiphase fluid flow; and
modeling the multiphase fluid flow based on the selected flow regime.

14. The apparatus of claim 13 further comprising tubing extending from a production zone of a wellbore penetrating a subterranean formation, wherein the tubing is in fluid communication with the conduit.

15. The apparatus of claim 13, wherein the electronic instrument is operable for determining the gas content of the multiphase fluid flow based on nuclear energy detected by the detector.

* * * * *